United States Patent [19]

Shohet et al.

[11] Patent Number: 4,909,164

[45] Date of Patent: Mar. 20, 1990

[54] HAZARDOUS WASTE INCINERATOR USING CYCLOTRON RESONANCE PLASMA

[76] Inventors: J. Leon Shohet, 1937 Arlington Pl., Madison, Wis. 53705; David T. Anderson, 908 Hawks Hollow, Delafield, Wis. 53018

[21] Appl. No.: 282,838

[22] Filed: Dec. 8, 1988

Related U.S. Application Data

[63] Continuation of Ser. No. 184,387, Apr. 21, 1988, abandoned.

[51] Int. Cl.$^4$ .............................................. F23G 7/04
[52] U.S. Cl. .................................... 110/346; 110/238; 110/250
[58] Field of Search ............... 110/238, 250, 237, 346; 422/186, 23

[56] References Cited

U.S. PATENT DOCUMENTS

| | | | |
|---|---|---|---|
| 3,052,614 | 9/1962 | Herold | 204/193.2 |
| 3,160,566 | 12/1964 | Dandl et al. | 176/7 |
| 4,479,443 | 10/1984 | Fieldt et al. | 110/238 X |
| 4,582,004 | 4/1986 | Fey et al. | 110/346 |
| 4,635,573 | 1/1987 | Santen | 110/346 |
| 4,718,362 | 1/1988 | Santen et al. | 110/346 |

*Primary Examiner*—Edward G. Favors
*Attorney, Agent, or Firm*—Carl E. Gulbrandsen; Jon Gealow

[57] ABSTRACT

A hazardou waste incinerator which utilizes a cyclotron resonance plasma. The plasma is generated by introducing vaporized hazardous material and a feed gas into a vacuum chamber. The chamber has a magnetic field source and an electromagnetic radiation source. The cyclotron resonance plasma is produced by the resonance that occurs when the frequency of the electromagnetic radiation is set equal to that of the gyration of electrons or other charged particles in the magnetic field according to the formula: $F_{res}=(\frac{1}{2}\pi)(qB/m)$ hertz Where q is the charge of the electron or ion, B is the strength of the magnetic field and m is the mass of the electron or ion. The strength of the electromagnetic radiation is adjusted so that the flowing gases are ionized, forming a plasma. During the reaction, the charged particles collide with neutral particles, providing both ionization and fragmentation (the breaking up of high-mass molecules into lower mass fragments). When electromagnetic radiation is applied at the ion cyclotron resonance frequency for a particular charge-to-mass ratio, ions of this ratio are accelerated outward and colilde with other particles in the plasma. This can result in further fragmenting of these ions or other particles or the ions will be selectively expelled or collected at the outer boundaries of the reactor.

14 Claims, 1 Drawing Sheet

HAZARDOUS WASTE INCINERATOR USING CYCLOTRON RESONANCE PLASMA

This application is a continuation of Ser. No. 07/184,387 filed Apr. 21, 1988, which is now abandoned.

FIELD OF THE INVENTION

This invention relates to the decomposing of hazardous waste materials with cyclotron resonance and more particularly to a method and apparatus for decomposing to basic forms hazardous waste materials such as polychlorinated biphenyls (PCB's).

BACKGROUND OF THE INVENTION

The problem of effectively and economically disposing of hazardous waste materials is becoming increasingly more acute. Chemicals such as polychlorinated biphenyls (PCB's) are by-products of our advanced technology which create an enormous health risk. Such chemicals are unusually stable when exposed to the environment, and when ingested by an animal, are neither broken down by the normal metabolic pathways nor excreted. Thus, they tend to become concentrated in the food chain and can exert their toxic effects for generations.

The stability of such toxic compounds as PCB's makes ordinary disposal techniques unsuitable. Disposal in landfills or sealed containers merely reserves the health risk for future generations. The only effective safe disposal of such compounds is one which decomposes the compound to nontoxic fragments or its basic forms.

Such decomposition is ordinarily accomplished by incineration at high temperatures. Typically, temperatures of 2000 to 3000 degrees centigrade are used with dwell times in the incinerator being consistent with the degree of destruction required for the particular waste material being incinerated. In addition, in conventional incinerators, fuel oil or natural gas is mixed with the material being incinerated to achieve or maintain the minimum required temperature for decomposition. This means that a temperature limitation problem arises. The maximum temperature of the material to be incinerated will be limited to the temperature of the furnace flame, and the result is that a long dwell time in the furnace may be required to achieve decomposition. See e.g. U.S. Pat. No. 4,481,891.

An alternative to the conventional incinerator is a system which utilizes a thermal arc plasma. See U.S. Pat. Nos. 4,509,434; 4,582,004 and 4,644,877. Because temperatures of more than 10,000 degrees centigrade are possible with plasmas, the dwell time can be substantially reduced. Such a system is presently being employed commercially by Westinghouse Plasma Systems in their Pyroplasma waste destruction unit. The Pyroplasma unit occupies the space of a large semi-trailer truck. It is able to process up to 3 gallons of certain types of liquid hazardous waste per minute with an electric power load of 750 kw. The purchase price of the unit is considerable and, as can be appreciated, the operating expense is not insubstantial.

Another type of plasma incinerator is seen in U.S. Pat. No. 3,818,845. In this case, a glow-discharge plasma, which is normally at lower pressure than the thermal arc plasma, is maintained by a low frequency r.f. potential applied around a reactor vessel. While the electrical power requirements of such a system are lower than the thermal arc plasma system, the throughput of the glow-discharge system may not be as great.

The present invention also utilizes a glow-discharge plasma. However, in this case a cyclotron resonance plasma is produced. In such a plasma, particles are not only ionized but are also caused to accelerate. Decomposition to basic forms of hazardous waste material such as PCB's is thus accomplished not only by high temperature, but also by bombardment by these accelerated particles which ionize and atomize the waste molecules. It is thus an object of this invention to decompose to basic forms hazardous waste material in a manner which is both more efficient and more economical than heretofore possible.

The cyclotron resonance plasma is produced by the resonance that occurs when the frequency of the electromagnetic radiation is set equal to that of the gyration of electrons or other charged particles in a magnetic field. It has the capability of selecting particular materials, based on their charge-to-mass ratio, for separate treatment. Its primary application, here, is the decomposition of hazardous waste materials by this process.

The hazardous waste material may be either a solid, liquid or gas. If it is a solid or liquid, either thermal heaters, direct combustion or electromagnetic heating can be used to vaporize the material. This vaporized material, together with a "feed" gas is injected into a reaction chamber. A set of magnetic field coils surrounds the chamber and is energized to provide a base magnetic field for the cyclotron resonance.

Electromagnetic radiation is fed into the chamber by means of hollow waveguides, ridged waveguides, or other suitable coupling devices. The frequency of the radiation is adjusted to match the desired resonance condition which is:

$$F_{res} = (\tfrac{1}{2}\pi)(qB/m) \text{ hertz}$$

Where q is the charge of the electron or ion, B is the strength of the magnetic field and m is the mass of the electron or ion. The strength of the electromagnetic radiation is adjusted so that the gases flowing through the chamber are ionized, forming a plasma. During the reaction, the charged particles collide with neutral particles, providing both ionization and fragmentation (the breaking up of high-mass molecules into lower mass fragments). When electromagnetic radiation is applied at the ion cyclotron resonance frequency for a particular charge-to-mass ratio, ions of this ratio are accelerated outward and collide with other particles in the plasma. This can result in further fragmenting of these ions or other particles or the ions will be selectively expelled or collected at the outer boundaries of the reactor.

Monitoring devices are used to determine the extent of the desired treatment of the flow gas. Examples of such monitoring devices may be mass spectrometers, optical spectrometers or laser-induced fluorescence devices. A system of automatic shut-off valves are connected in the output line to keep unprocessed gas from the atmosphere.

SUMMARY OF THE INVENTION

The present invention uses a cyclotron resonance plasma device to ionize and atomize waste materials. The ionized materials can be selectively collected and/or they may be fragmented into non-toxic materials before collecting. Non-ionized, but atomized gaseous waste materials can be additionally treated to insure their being environmentally safe.

According to one aspect of the invention, a method is provided for the decomposition of waste material by subjecting a vaporized form of the waste material to a plasma discharge formed by the interaction of electromagnetic radiation in a magnetic field of value such that the natural resonant orbiting frequency (cyclotron frequency) of electrons is the same as the frequency of the electromagnetic radiation with a combination of waste vapor and a nontoxic feed gas. This interaction ionizes and fragments the waste vapor and feed gas producing a cyclotron resonance plasma. The vapor may be formed by evaporation of liquids and/or heating of solids. The plasma-treated vapor is monitored to determine the composition of the toxic and non-toxic materials present in the vapor by means of a mass spectrometer, optical spectrometer or other appropriate measuring equipment. After exiting from the reaction chamber, the vapor is then cooled and further treated to insure that the final release of vapor to the atmosphere is environmentally safe. The feed gas may be used initially to produce a target plasma for the vapor, continuously with the waste vapor for process control or also to flush the system during shut down of the process.

According to another aspect of the invention, there is provided a method for additional decomposition of waste material in the plasma produced by the process described above to additionally heat and/or selectively excite particular products of the reaction, by means of a second source of electromagnetic radiation adjusted to the natural resonant orbiting frequency (cyclotron frequency) of particular ionized material in the plasma. Since the ion cyclotron frequency is dependent on the charge and mass of a particular ion, this method provides a means to select those ions for special treatment, such as additional fragmentation or collection.

According to another asepct of the invention, the electromagnetic radiation used to produce the plasma and/or excite ions of a particular charge-to-mass ratio may produce the plasma in a region which is separated from the reaction chamber. Plasma then flows from the source to the reaction chamber where the interaction with the hazardous waste vapor occurs.

According to another aspect of the invention, the vaporization method may be applied to liquid or solid materials.

The novel features which are believed to be characteristic of the invention, both as to its organization and method of operation, together with further objectives and advantages thereof, will be better understood from the following drawing in which a presently preferred embodiment of the invention is illustrated by way of example. It is to be expressly understood, however, that the drawing is for the purpose of illustration and description only and is not intended as a definition of the limits of the invention.

DETAILED DESCRIPTION OF THE PRESENTLY PREFERRED EMBODIMENT

Figure 1:
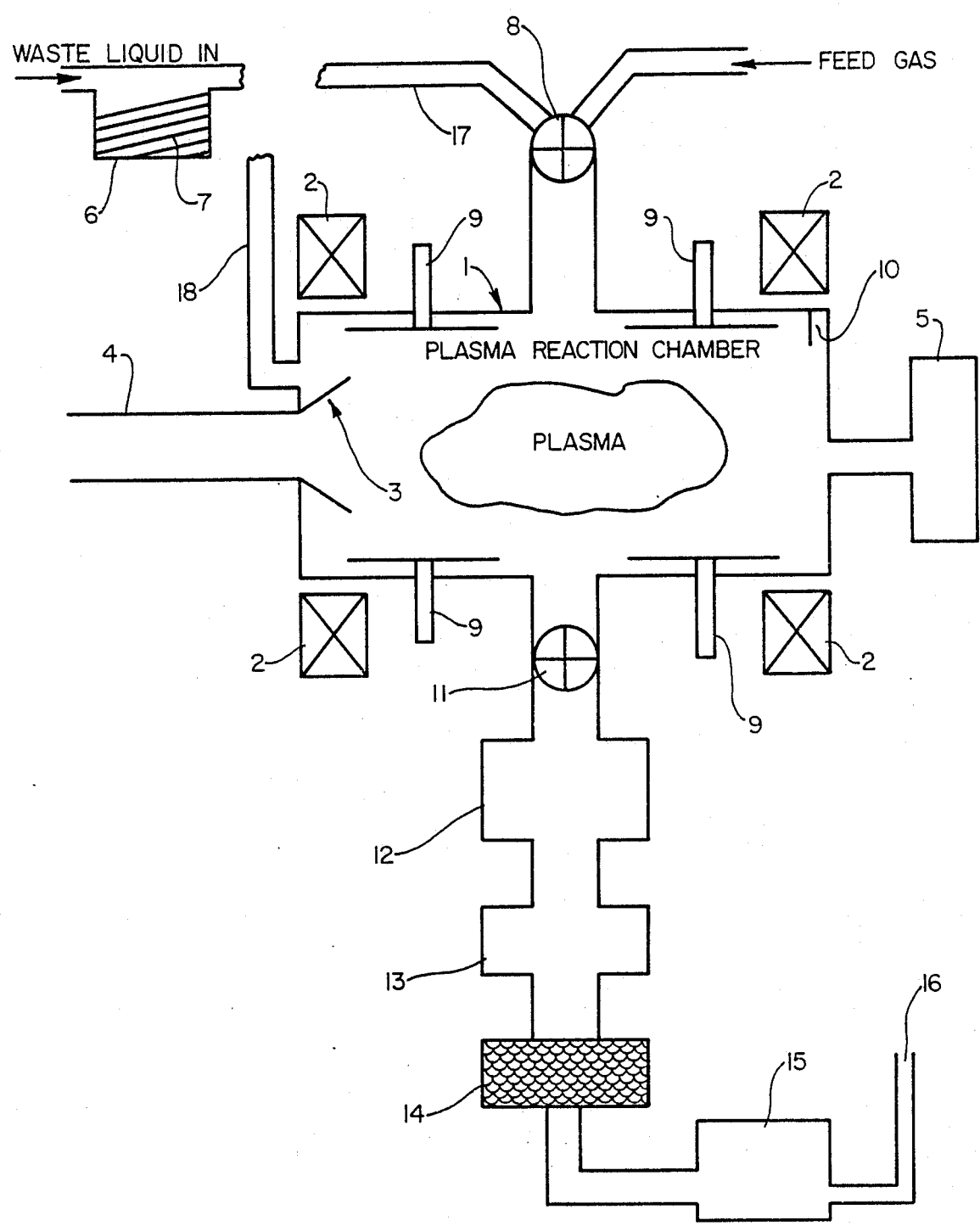
FIG. 1 is a diagrammatic view of the presently preferred embodiment of the apparatus used for the treatment of hazardous wastes with cyclotron resonance plasmas according to the present invention.

Referring to the drawing shown in FIG. 1, a plasma reaction chamber of the type described in U.S. Pat. No. 3,767,929, incorporated herein by reference, which includes the following main components: A vacuum chamber 1 which is surrounded by magnetic field coils 2 for producing within the chamber the base magnetic field necessary to produce the cyclotron resonance. A horn antenna 3 couples and directs into the chamber electromagnetic radiation, which is primarily in the microwave portion of the spectrum. The horn antenna is connected to the microwave generator through a waveguide system 4.

In addition, the apparatus of the presently preferred embodiment includes process sensors 5 to monitor the reaction and determine the composition of toxic and nontoxic materials present in the vapor. Such sensors might consist of a mass spectrometer, optical emission detector and/or other appropriate diagnostics, as well as other components described below.

The vaporized material is produced by allowing liquid hazardous waste material to enter evaporator 6 where it is heated by heater coil 7. The heater coil will stop evaporation whenever it is determined that the system is not operating within normal limits or in the event of an electrical power failure. The vaporized material is then moved through conduit 17 to the mixing/metering valve 8 where the vapor is mixed with a feed gas such as oxygen, argon, helium, nitrogen and so forth. The choice of feed gas depends upon the requirements for decomposition of a particular hazardous waste material. The feed gas may be used not only to generate a plasma for interacting with the vaporized hazardous material, but may also be used to provide chemical reactants to chemically detoxify the hazardous material. The mixing valve also shuts the flow from the evaporator if it is determined that the system is not operating within normal limits or in the event of an electrical power failure. From the mixing valve 8 the mixture of vaporized material and feed gas is passed to the chamber 1. In the chamber the mixture is exposed to the combination of the magnetic field of sufficient strength and electromagnetic radiation of sufficient frequency and intensity so as to produce with such mixture a cyclotron resonance plasma. Selective excitation of ions may also be done through a series of 4 or more plate antennas 9. These antennas may be energized with several r.f. generator sources or with a single source of single or multiple frequency components. The r.f. sources may be fixed frequency or they may be swept in frequency with a pre-programmed sweep and amplitude rate, so that only ions of a desired charge-to-mass ratio are excited. Excited ions are collected at the walls of the chamber 1 or allowed to pass through the chamber into ion collectors 10.

When as previously set forth, the feed gas is used to produce a target plasma for the vapor, the vapor is directed through conduit 18 directly to the plasma reaction chamber, rather than through conduit 17 to the mixing/metering valve 8.

When the feed gas is used to produce a target plasma, the upper portion of the plasma reaction chamber, as shown in FIG. 1, becomes in effect a plasma generating chamber, and the lower portion of the plasma reaction chamber, as shown in FIG. 1, becomes a reaction chamber where the plasma generated in the upper portion and the vapor introduced through conduit 18 interact to create products including fragments and/or ions which result from the ionization and fragmentation of the molecules of the vapor.

Remaining vapor is expelled from the chamber 1 through a throttle valve 11, and is monitored in an analysis chamber 12. The throttle valve 11 is also used as a failure detector and automatically shuts if the process detection equipment indicates that the process is not operating properly or in the event of an electrical power failure. A molecular sieve and main vacuum pump 13 provide the main driving force for the system. An HCl scrubber 14 is used to remove traces of this gas, which is often produced in the decomposition of polychlorinated polyphenyls (PCB's). A final backing pump 15 moves the end products to the atmosphere where they may be burned in flue 16 if necessary.

It will be apparent to persons skilled in the art that the system shown in the drawing is only a schematic or diagrammatic representation of the complete system. Additional valves, different types of valves, and various other sensors, electromagnetic field launchers and other appropriate process control components would be employed in an actual installation.

What we claim is:

1. A method for decomposing to basic forms hazardous waste material comprising the steps of:
   vaporizing, if not already a vapor, the hazardous waste material to form a vapor,
   mixing said vapor with a feed gas to form a mixture,
   introducing said mixture into a plasma reaction chamber,
   subjecting said mixture in said chamber to a combination of electromagnetic radiation of a sufficient first frequency and intensity and a magnetic field of sufficient strength so as to produce from said mixture a cyclotron resonance plasma, said cyclotron resonance plasma and said vapor interacting to create products including fragments and/or ions, resulting from the ionization and fragmentation of the molecules of said vapor,
   monitoring said products and maintaining said cyclotron resonance plasma until desired fragments and/or ions are produced,
   collecting said products for further treatment and/or safe release into the environment.

2. A method as claimed in claim 1, wherein said mixture is exposed to electromagnetic radiation of at least one frequency different from said first frequency which will selectively excite ions of a specific charge-to-mass ratio.

3. A method for decomposing to basic forms hazardous waste material comprising the steps of:
   vaporizing, if not already a vapor, the hazardous waste material to form a vapor,
   introducing a feed gas into a plasma generating chamber,
   subjecting said feed gas in said chamber to a combination of electromagnetic radiation of a sufficient first frequency and intensity and a magnetic field of sufficient strength so as to produce a cyclotron resonance plasma,
   introducing said plasma and said vapor into a reaction chamber so as to cause interaction between said plasma and said vapor said interaction creating products including fragments and/or ions, resulting from the ionization and fragmentation of the molecules of said vapor,
   monitoring said products of said interaction and maintaining said cyclotron resonance plasma until the desired fragments or ions are produced,
   collecting said products for further treatment and/or safe release into the environment.

4. A method as claimed in claim 3, wherein said plasma and said vapor are exposed to electromagnetic radiation of at least one frequency different from said first frequency which will selectively excite ions of a specific charge-to-mass ratio.

5. An apparatus for decomposing to basic forms hazardous waste material comprising:
   a means for vaporizing, if not already a vapor, hazardous waste material to form a vapor;
   a means for mixing said vapor with a feed gas to form a mixture;
   a plasma reaction chamber having means for producing within said chamber a magnetic field;
   an electromagnetic radiation source for introducing into said chamber electromagnetic radiation,
   a means for introducing said mixture into said chamber, said electromagnetic radiation having a sufficient first frequency and intensity and said magnetic field having sufficient strength to in combination cause in the mixture a cyclotron resonance of sufficient intensity to produce a cyclotron resonance plasma, which interacts with said vapor to create reaction products,
   said chamber having a means for monitoring the reaction products so that the reaction may be terminated and the reaction products expelled from said chamber when the desired reaction products are produced.

6. An apparatus for decomposing to basic forms hazardous waste material as claimed in claim 5, wherein said plasma reaction chamber includes at least a second electromagnetic radiation source for introducing into said chamber electromagnetic radiation of a second frequency different from said first frequency which will selectively excite ions of a specific charge-to-mass ratio.

7. An apparatus for decomposing to basic forms hazardous waste material as claimed in claim 6, further including a means to collect selectively excited ions.

8. An apparatus for decomposing to basic forms hazardous waste material as claimed in claim 5, further comprising a hydrochloric acid scrubber.

9. An apparatus for decomposing to basic forms hazardous waste material comprising:
   a means for vaporizing, if not already a vapor, the hazardous waste material to form a vapor;
   a plasma generator having an electromagnetic source of sufficient frequency and intensity to generate a plasma from a feed gas;
   a plasma reaction chamber having means for producing within said chamber a magnetic field;
   means for introducing said plasma and said vapor into said plasma reaction chamber,
   an electromagnetic radiation source for introducing into said chamber electromagnetic radiation, said electromagnetic radiation having a sufficient first frequency and intensity and the magnetic field produced by said means having sufficient strength to in combination with the electromagnetic radiation cause in said plasma and said vapor a cyclotron resonance of sufficient intensity to produce a cyclotron resonance plasma, which creates reaction products, said chamber having a means for monitoring the reaction products of the cyclotron resonance plasma so that the reaction may be terminated and the products expelled from said chamber when the desired products are produced.

10. An apparatus for decomposing to basic forms hazardous waste material as claimed in claim 9, wherein said plasma reaction chamber includes at least a second electromagnetic radiation source for introducing into said chamber electromagnetic radiation of a second frequency different from said first frequency which will selectively excite ions of a specific charge-to-mass ratio.

11. An apparatus for decomposing to basic forms hazardous waste material as claimed in claim 10, further including a means to collect selectively excited ions.

12. An apparatus for decomposing to basic forms hazardous waste material as claimed in claim 9, further comprising a hydrochloric acid scrubber.

13. An apparatus for decomposing to basic forms hazardous waste material as claimed in claim 5, wherein said means for producing within said chamber a magnetic field are magnetic field coils.

14. An apparatus for decomposing to basic forms hazardous waste material as claimed in claim 9, wherein said means for producing within said chamber a magnetic field are magnetic field coils.

* * * * *